United States Patent
Maruyama

(10) Patent No.: US 10,958,500 B2
(45) Date of Patent: Mar. 23, 2021

(54) COMMUNICATION DEVICE, OPERATION METHOD, AND MEDIUM

(71) Applicant: BUFFALO INC., Aichi (JP)

(72) Inventor: Yutaka Maruyama, Aichi (JP)

(73) Assignee: BUFFALO INC., Aichi (JP)

( * ) Notice: Subject to any disclaimer, the term of this patent is extended or adjusted under 35 U.S.C. 154(b) by 28 days.

(21) Appl. No.: 16/352,870

(22) Filed: Mar. 14, 2019

(65) Prior Publication Data
US 2019/0306003 A1 Oct. 3, 2019

(30) Foreign Application Priority Data
Mar. 29, 2018 (JP) .............................. JP2018-065252

(51) Int. Cl.
| | |
|---|---|
| *H04L 29/06* | (2006.01) |
| *H04W 48/04* | (2009.01) |
| *G06F 1/16* | (2006.01) |
| *H05B 47/19* | (2020.01) |
| *G16Y 40/35* | (2020.01) |

(52) U.S. Cl.
CPC ...... *H04L 29/06326* (2013.01); *G06F 1/1698* (2013.01); *G16Y 40/35* (2020.01); *H04W 48/04* (2013.01); *H05B 47/19* (2020.01)

(58) Field of Classification Search
None
See application file for complete search history.

(56) References Cited

U.S. PATENT DOCUMENTS

| | | | | |
|---|---|---|---|---|
| 2003/0009583 | A1* | 1/2003 | Chan | H04L 69/169 |
| | | | | 709/236 |
| 2013/0205378 | A1 | 8/2013 | Oba et al. | |
| 2013/0250803 | A1* | 9/2013 | Abraham | H04L 67/16 |
| | | | | 370/254 |

(Continued)

FOREIGN PATENT DOCUMENTS

| | | |
|---|---|---|
| JP | 2005-339008 A | 12/2005 |
| JP | 2013-161217 A | 8/2013 |

OTHER PUBLICATIONS

Rusen. "Simple questions: What is WPS (Wi-Fi Protected Setup) and how does it work?" posted at https://www.digitalcitizen.life/simple-questions-what-wps-wi-fi-protected-setup on Sep. 18, 2017 (Year: 2017).*

(Continued)

*Primary Examiner* — Scott B Christensen
(74) *Attorney, Agent, or Firm* — Xsensus LLP

(57) ABSTRACT

A communication device that includes processing circuitry that receives an input to switch an operation mode between a first operation mode in which access to the communication device or a connected device connected to the communication device is restricted and a second operation mode in which access is not restricted; controls the access from devices that transmitted access requests in accordance with the first operation mode or the second operation mode, which is designated by the received input; and permits a no-permission device that has no permission for the access to access the communication device or the connected device based on an access request from the no-permission device by registering the no-permission device as a permission device, in a case where the operation mode is the second operation mode.

22 Claims, 10 Drawing Sheets

(56) References Cited

U.S. PATENT DOCUMENTS

| | | | |
|---|---|---|---|
| 2015/0113627 A1* | 4/2015 | Curtis | H04L 63/06 726/10 |
| 2017/0171187 A1* | 6/2017 | Yin | H04L 9/3242 |
| 2017/0202037 A1* | 7/2017 | Hong | H04W 76/10 |

OTHER PUBLICATIONS

Lloyd, Craig. "How to Set Up the Belkin WeMo Switch." Posted at <https://www.howtogeek.com/249590/how-to-set-up-the-belkin-wemo-switch/> on Apr. 12, 2016. (Year: 2016).*

* cited by examiner

COMMUNICATION DEVICE, OPERATION METHOD, AND MEDIUM

CROSS-REFERENCE TO RELATED APPLICATION

This application is based on and claims priority under 35 USC 119 from Japanese Patent Application No. 2018-065252, filed on Mar. 29, 2018, the contents of which are incorporated herein by reference.

TECHNICAL FIELD

The present disclosure relates to a communication device, an operation method of the communication device, and a medium.

BACKGROUND

It is known that an electronic device (for example, a lighting device, a robot vacuum cleaner, a photographing device, an air conditioner, or a Network Attached Storage (NAS)) is connected to the Internet or a network such as a Local Area Network (LAN). The electronic device has a communication function of being remotely operated by an operation device such as a smartphone connected to the same network. The electronic device functions in response to an access request from the operation device connected to the network. Such an electronic device is hereinafter referred to as a communication device.

The communication device requires access control for only limited persons to access. For example, when the communication device requests the operation device to transmit an ID and a password and receives a registered ID and the password from the operation device, access from the operation device to the communication device is permitted.

Japanese Patent Application Laid-Open Publication No. 2005-339008 (Patent Document 1) describes, for example, determination of a device permitted to access a communication device in the past as described above using a cookie transmitted from the device.

In Japanese Patent Application Laid-Open Publication No. 2013-161217 (Patent Document 2) describes a technique in which communication between a communication device and a device registration server is enabled for a certain period of time when a push button of the communication device and a push button of the device registration server are pressed.

In the meantime, communication connection authentication is automatically performed between the communication device and the device registration server. The communication device can communicate with a device control device after the communication connection authentication is performed.

In a method of permitting access to the communication device using the ID and the password transmitted from the operation device, operation is complicated since, for example, it is necessary to input the ID and the password to the operation device.

When the ID and the password are leaked, security is lowered and it is possible to access the communication device from a terminal owned by a person other than an owner of the operation device. When a function of changing the ID and the password is implemented in the communication device so as to increase the security against such information leakage, costs of the communication device increases.

Patent Document 2 describes communication connection authentication performed automatically between two devices. However, it is not considered how to determine whether or not access (connecting to a certain device and causing it to function (operating the device)) is permitted.

SUMMARY

The present disclosure provides a communication device, including: processing circuitry configured to receive an input to switch an operation mode between a first operation mode in which access to the communication device or a connected device connected to the communication device is restricted and a second operation mode in which access is not restricted; control the access from devices that transmitted access requests in accordance with the first operation mode or the second operation mode, which is designated by the received input; and permit a no-permission device that has no permission for the access to access the communication device or the connected device based on an access request from the no-permission device by registering the no-permission device as a permission device, in a case where the operation mode is the second operation mode.

The present disclosure also provides an operation method, including: receiving an input to switch an operation mode between a first operation mode in which access to a communication device or a connected device connected to the communication device is restricted and a second operation mode in which access is not restricted; controlling, using processing circuitry, the access from devices that transmitted access requests in accordance with the first operation mode or the second operation mode, which is designated by the received input; and permitting, using the processing circuitry, a no-permission device that has no permission for the access to access the communication device or the connected device based on the access request from the no-permission device by registering the no-permission device as a permission device, in a case where the operation mode is the second operation mode.

The present disclosure also provides a non-transitory computer-readable medium including executable instructions, which when executed by a computer cause the computer to execute an operation method, the operation method including: receiving an input to switch an operation mode between a first operation mode in which access to the communication device or a connected device connected to the communication device is restricted and a second operation mode in which access is not restricted; controlling the access from devices that transmitted access requests in accordance with the first operation mode or the second operation mode, which is designated by the received input; and permitting a no-permission device that has no permission for the access to access the communication device or the connected device based on the access request from the no-permission device by registering the no-permission device as a permission device, in a case where the operation mode is the second operation mode.

BRIEF DESCRIPTION OF DRAWINGS

Exemplary embodiments of the present disclosure will be described in detail based on the following figures, wherein.

DETAILED DESCRIPTION

The present disclosure is made in view of the above circumstances. An object of the present disclosure is to provide an inexpensive and convenient communication device that can ensure security, an operation method of a communication device, and an operation program of a communication device.

Hereinafter, embodiments of the present disclosure are described with reference to the figures.

Figure 1:
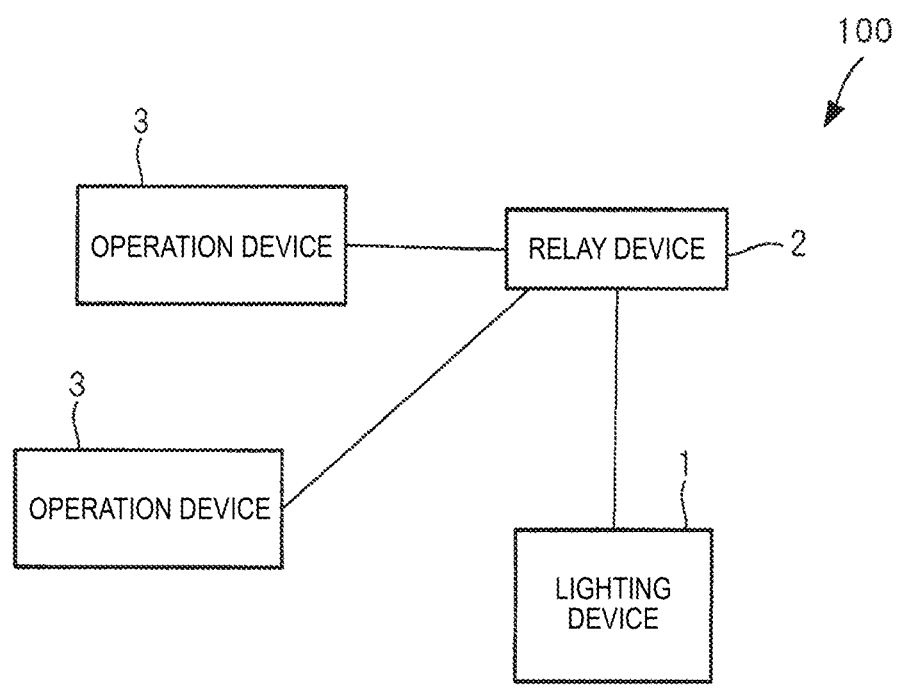
FIG. 1 is a diagram showing a schematic configuration of a system 100 that remotely operates a lighting device 1 according to an embodiment of a communication device of the present disclosure.

FIG. 1 is a diagram showing a schematic configuration of a system 100 that remotely operates a lighting device 1 according to an embodiment of a communication device of the present disclosure. The system 100 includes a lighting device 1, a plurality of operation devices 3, and a relay device 2 connected to the lighting device 1 and the plurality of operation devices 3.

An operation device 3 is an electronic device having a network communication function of performing network communication, and includes a display unit and an operation interface (I/F) such as a keyboard, a mouse, or a touch panel. The operation device 3 is a personal computer, a tablet computer, a smartphone, and the like. The operation device 3 can communicate with the lighting device 1 via the relay device 2.

The relay device 2 is a router, a gateway, and the like, which connects the operation device 3 and the lighting device 1 so as to enable communication therebetween.

In the system 100, the relay device 2 may be connected to the Internet. In this case, the operation device 3 may be connected to the relay device 2 via the Internet.

In the following description, it is assumed that the operation device 3, the relay device 2, and the lighting device 1 can communicate based on Transmission Control Protocol (TCP)/Internet Protocol (IP).

Figure 2:
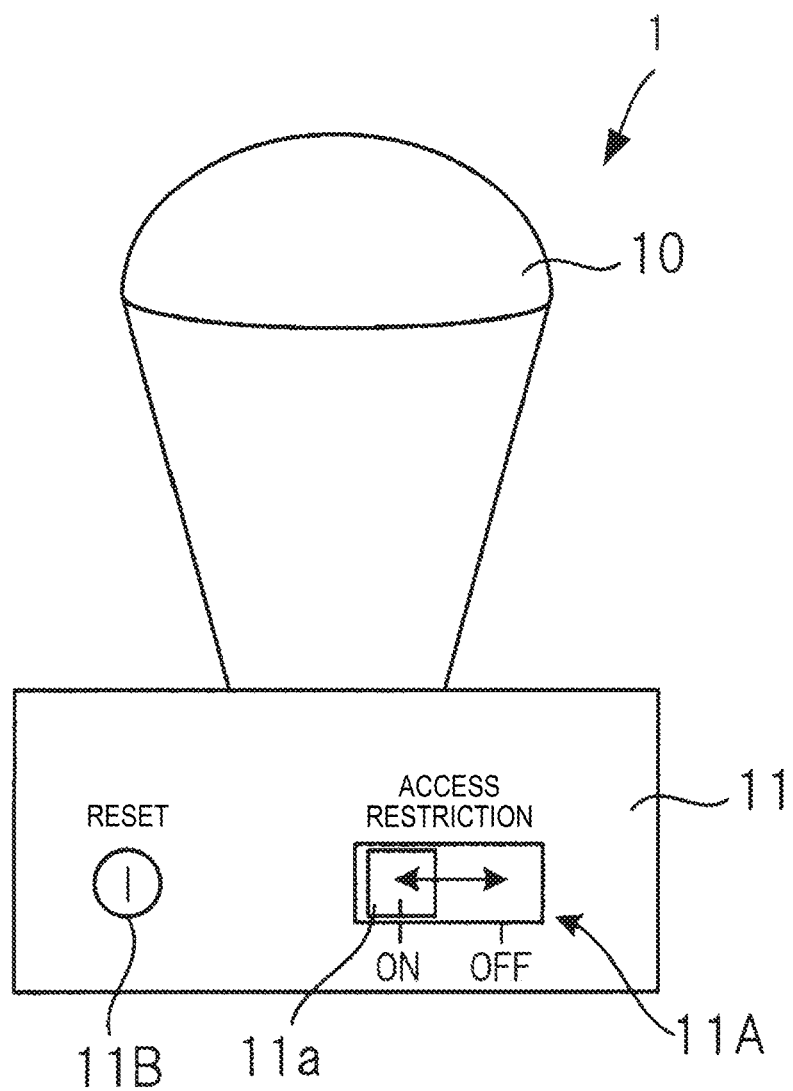
FIG. 2 is a view schematically illustrating an appearance of the lighting device 1 in FIG. 1.

FIG. 2 is a view schematically illustrating an appearance of the lighting device 1 in FIG. 1. The lighting device 1 includes a light emitting unit 10 that emits light and a main body portion 11.

The main body portion 11 includes a slide switch 11A having a movable member 11a that can move to left and right, and a reset button 11B that outputs an operation signal when being pressed.

The slide switch 11A is an operation member that switches an operation mode of the lighting device 1 between a restricted access mode that is a first operation mode and an unrestricted access mode that is a second operation mode.

In the restricted access mode, access from the operation device 3 is restricted (hereinafter, also referred to as "no-permission device"), in which access to the lighting device 1 is not permitted.

In the unrestricted access mode, access restricted by the restricted access mode is released and access from all of the operation devices 3 is permitted (that is, a mode in which access is not restricted).

The lighting device 1 operates in the restricted access mode by setting the movable member 11a of the slide switch 11A to an "ON" position, and operates in the unrestricted access mode by setting the movable member 11a of the slide switch 11A to an "OFF" position.

The slide switch 11A outputs an ON signal when the movable member 11a is in the "ON" position, and outputs an OFF signal when the movable member 11a is in the "OFF" position.

Although the slide switch 11A is a member that changes its state by moving the movable member 11a to the left and right, the present disclosure is not limited thereto. For example, the slide switch 11A may also be an operation member such as a touch panel integrated with a display element.

In this case, the slide switch 11A causes the display element to display buttons of "ON" and "OFF" in images, and detects the "ON" button or the "OFF" button by the touch panel. The slide switch 11A outputs an ON signal when the "ON" button is pressed, and outputs an OFF signal when the "OFF" button is pressed.

The slide switch 11A may be any operation interface capable of inputting information directly to the lighting device 1 without passing through the network. The information is used to instruct switching of the operation mode or deletion of registration information to be described below. Examples of such an operation interface may include a push switch, a toggle switch, a slide switch, a dip (DIP) switch, a rotary switch, a dip (DIP) rotary switch, a rocker switch, and the like.

Figure 3:
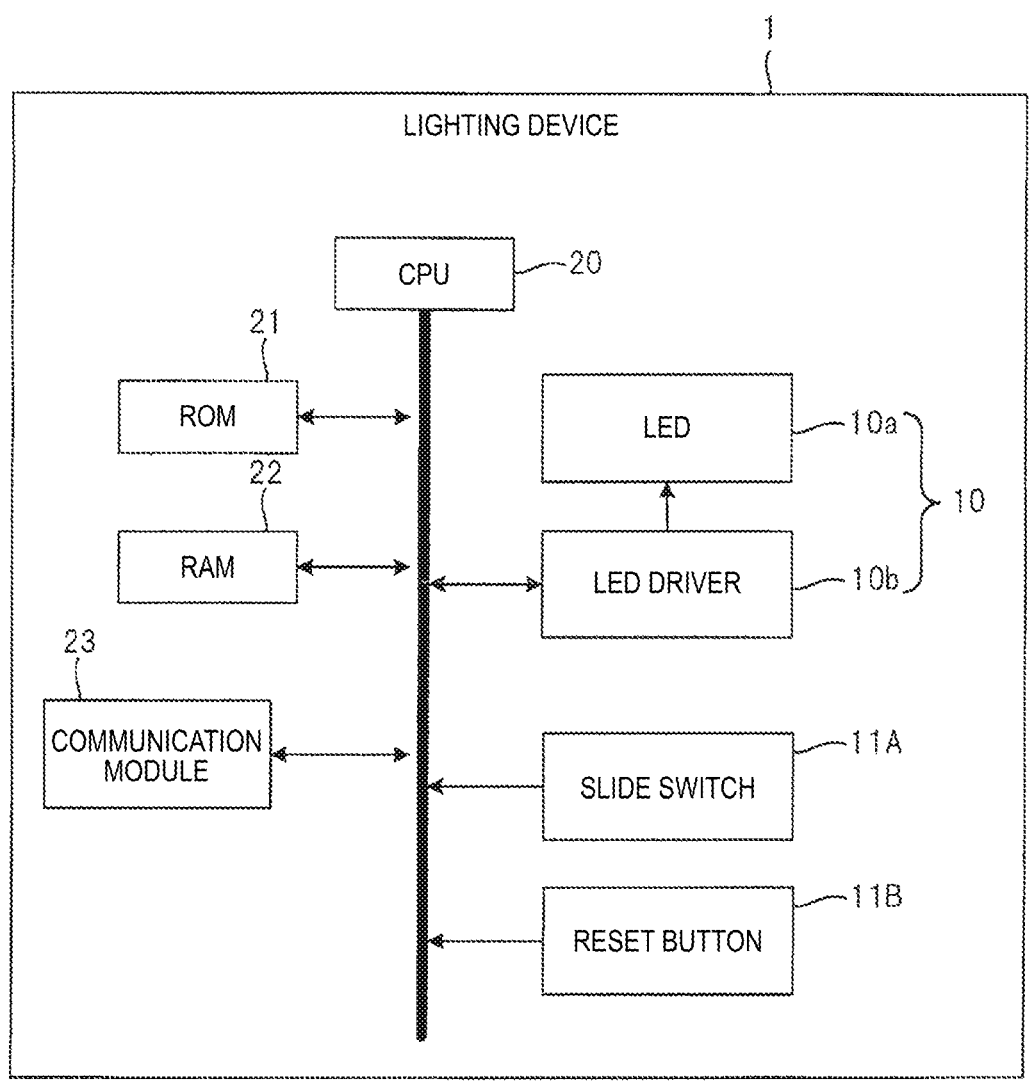
FIG. 3 is a block diagram schematically showing an internal configuration of the lighting device 1 in FIG. 1.

FIG. 3 is a block diagram schematically showing an internal configuration of the lighting device 1 in FIG. 1.

The lighting device 1 includes a Central Processing Unit (CPU) 20, a Read Only Memory (ROM) 21, a Random Access Memory (RAM) 22, the light emitting unit 10, a communication module 23, the slide switch 11A, and the reset button 11B. The light emitting unit 10 includes a Light Emitting Diode (LED) 10a as a light emitting element and an LED driver 10b that drives the LED 10a.

The CPU 20, the ROM 21, the RAM 22, the communication module 23, the LED driver 10b, the slide switch 11A, and the reset button 11B are connected by a common bus. The ON signal and the OFF signal from the slide switch 11A and the operation signal from the reset button 11B are input to the CPU 20, respectively.

The communication module 23 communicates with the relay device 2 wirelessly or by wire. The communication module 23 performs wireless communication according to, for example, Institute of Electrical and Electronics Engineers (IEEE) 802.11 standard. Alternatively, the communication module 23 performs wired communication according to a standard such as 1000BASE-T, 100BASE-TX, or 10BASE-T.

The CPU 20 controls operation of the whole lighting device 1 by executing a program such as firmware stored in the ROM 21 after the program is loaded into the RAM 22.

The ROM 21 stores data and a program such as the firmware. The RAM 22 operates as a main memory of the lighting device 1, and stores various programs and data.

Figure 4:
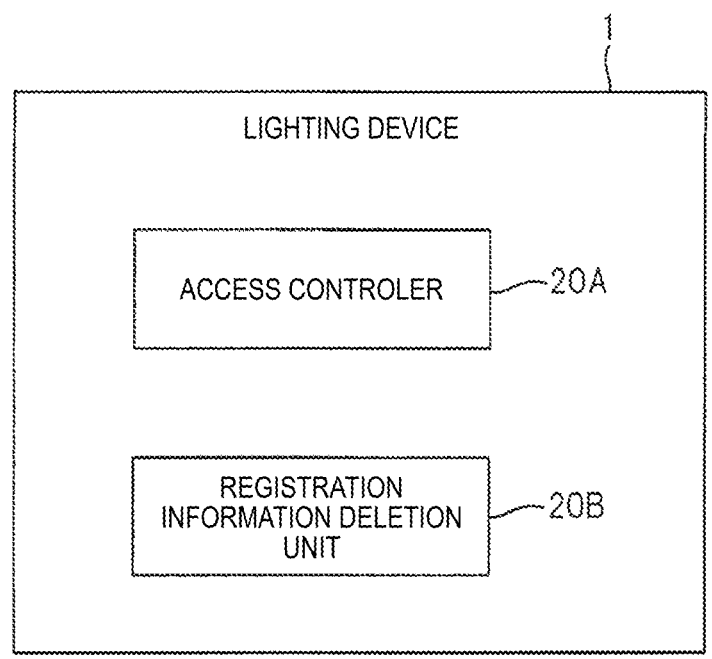
FIG. 4 is a functional block diagram of the lighting device 1 in FIG. 1.

FIG. 4 is a functional block diagram of the lighting device 1 in FIG. 1.

The CPU 20 cooperates with other units by executing a program including an operation program stored in the ROM 21. Accordingly, the lighting device 1 functions as an access controller 20A and a registration information deletion unit 20B.

The access controller 20A controls access from a device that transmits an access request in accordance with one of the restricted access mode and the unrestricted access mode designated by the state of the slide switch 11A.

Specifically, when the slide switch 11A designates the unrestricted access mode (when the movable member 11a is in the "OFF" position in FIG. 2 and the OFF signal is output), the access controller 20A operates in the unrestricted access mode in which access from all of the operation devices 3 is permitted.

When the access controller 20A in the unrestricted access mode receives an access request from a no-permission device, the access controller 20A registers the no-permission device as a permission device and permits access based on the access request.

A fact that the operation device 3 is registered as a permission device means that, authentication information (for example, at least one of an ID and a password) necessary for access to the lighting device 1 is generated and associated with identification information (for example, an IP address, a device-specific ID, or a MAC address) that identifies the operation device 3, and is stored in the ROM 21 together with the identification information.

The identification information for the operation device 3 stored in the ROM 21 and the corresponding authentication information constitute registration information of the operation device 3.

The lighting device 1 stores no registration information in the ROM 21 at the time of product shipment. Therefore, in order to access the lighting device 1 for the first time, a user needs to set the movable member 11a of the slide switch 11A to the "OFF" position and access the lighting device 1 from the operation device 3 to be registered as a permission device.

When the access controller 20A in the unrestricted access mode receives an access request, the access controller 20A determines whether the operation device 3 that requested access is a permission device. When the operation device 3 is a permission device, access based on the access request is permitted. When the operation device 3 is a no-permission device, as described above, the operation device 3 is registered as a permission device, and access based on the access request is permitted.

On the other hand, when the slide switch 11A designates the restricted access mode (when the movable member 11a is in the "ON" position in FIG. 2 and the ON signal is output), the access controller 20A operates in the restricted access mode in which only access from a permission device having registration information stored in the ROM 21 is permitted.

When the registration information deletion unit 20B receives an operation signal output by pressing the reset button 11B, the registration information deletion unit 20B deletes all registration information stored in the ROM 21. In this manner, the reset button 11B constitutes a deletion operation member that instructs deletion of registration information. When the reset button 11B is pressed, the registration information deletion unit 20B is instructed to delete the registration information.

Although the reset button 11B outputs an operation signal by pushing a movable member, the present disclosure is not limited thereto. For example, a reset button may be displayed in an image on a touch panel integrated with a display element, and an operation signal may be output when it is detected that the reset button is pressed.

The reset button 11B may be any operation interface capable of inputting information directly to the lighting device 1 without going through the network. The information is used to instruct deletion of registration information to be described below. Examples of such an operation interface may include a push switch, a toggle switch, a slide switch, a dip (DIP) switch, a rotary switch, a dip (DIP) rotary switch, a rocker switch, and the like.

Figure 5:
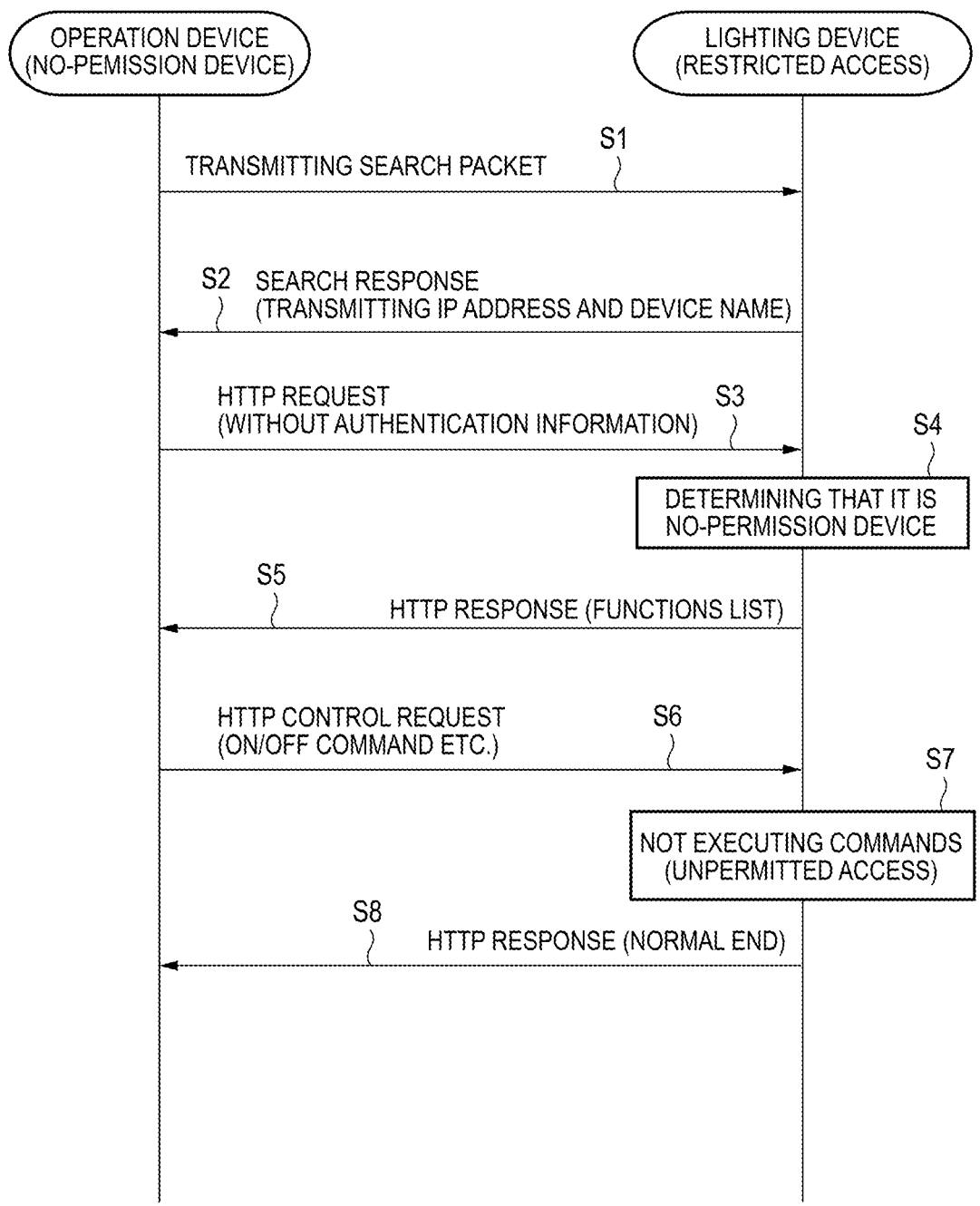
FIG. 5 is a sequence chart showing processes between an operation device 3 and the lighting device 1 in a restricted access mode.

FIG. 5 is a sequence chart showing processes between the operation device 3 and the lighting device 1 in the restricted access mode. FIG. 5 shows operations in which the operation device 3, which is a no-permission device, attempts to access the lighting device 1.

First, the operation device 3 (no-permission device) transmits a search packet used for searching the lighting device 1 by broadcast communication to a device connected to the operation device 3 (step S1). Upon receiving the search packet, the lighting device 1 transmits an IP address of the lighting device 1 and a device name as information capable of specifying the lighting device 1 to the operation device 3 (step S2) as a response to the search packet for the lighting device 1. The information capable of specifying the lighting device 1 may be an ID, an MAC address, and the like that are unique to the lighting device 1.

Upon receiving the IP address and the device name of the lighting device 1, the operation device 3 transmits an access request (HTTP request) to the lighting device 1 through Hypertext Transfer Protocol (HTTP) communication (step S3). The access request does not include authentication information.

The access controller 20A of the lighting device 1 that has received the access request determines whether or not an IP address of the operation device 3 that has performed the HTTP request is stored in the ROM 21. In this case, the IP address is not stored in the ROM 21 since the operation device 3 is a no-permission device. Therefore, the access controller 20A determines that the operation device 3 that has performed the HTTP request is a no-permission device (step S4). Accordingly, the operation device 3 is not permitted to access the lighting device 1.

After step S4, the access controller 20A returns response information including a list of functions of the lighting device 1 to the operation device 3 through HTTP communication (step S5).

Upon receiving the response information, the operation device 3 transmits a command to perform a prescribed function to the lighting device 1 through HTTP communication (step S6). Examples of the command include a command to instruct the light emitting unit 10 to emit light, a command to turn off the light emitting unit 10, or a command to change a light color emitted from the light emitting unit 10.

Upon receiving the command, the access controller 20A of the lighting device 1 does not execute the command since the operation device 3 is a no-permission device (step S7). Then, the access controller 20A transmits a response to the command (for example, information indicating that the command has been normally completed) to the operation device 3 (step S8), and normally ends communication with the operation device 3. In step S8, the access controller 20A may also normally end the communication with the operation device 3 without transmitting anything other than header information to the operation device 3. A response transmitted to the operation device 3, which is a no-permission device, may be the same as a response transmitted to the operation device 3 which is a permission device.

Figure 6:
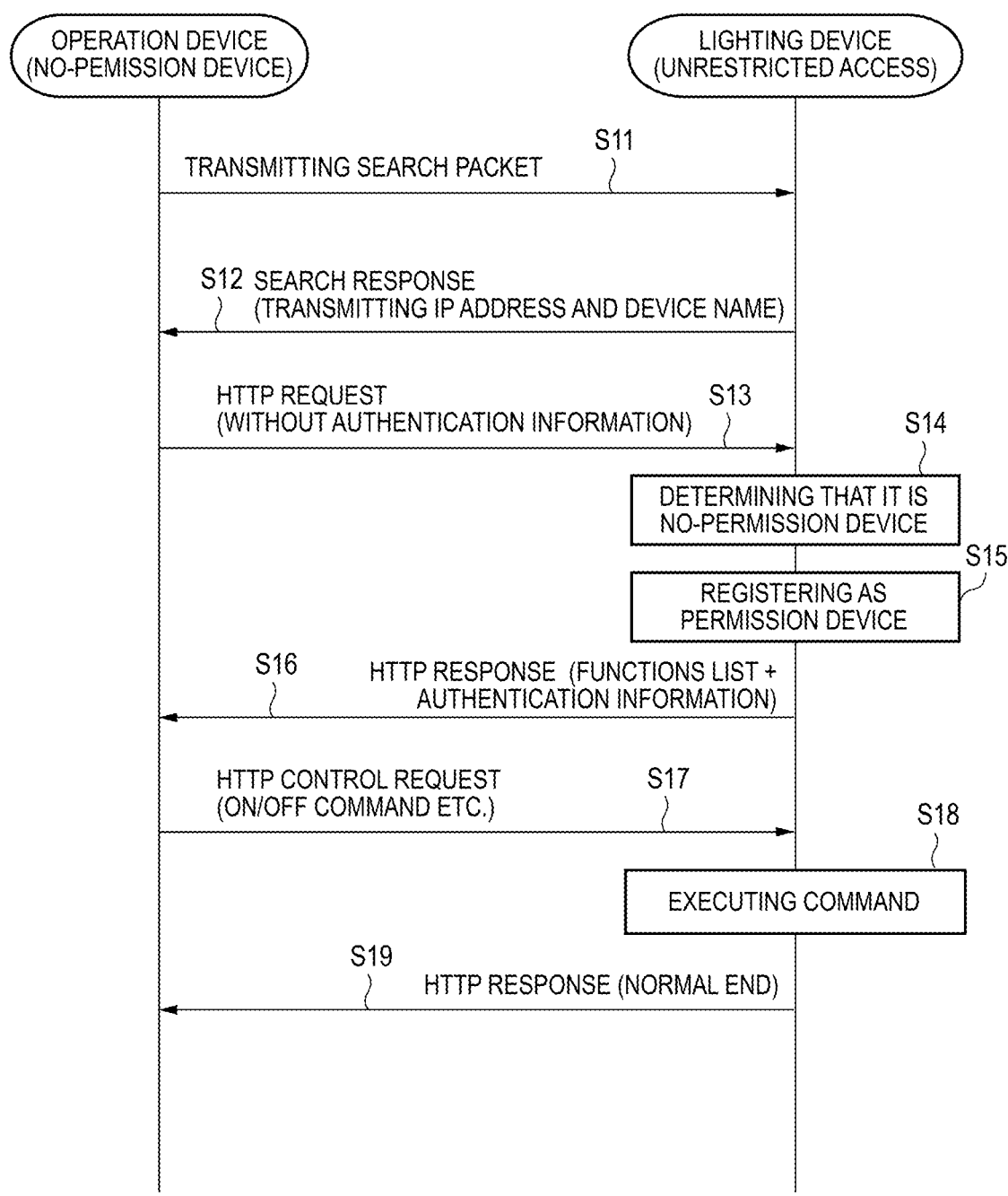
FIG. 6 is a sequence chart showing processes between the operation device 3 and the lighting device 1 in an unrestricted access mode.
Figure 7:
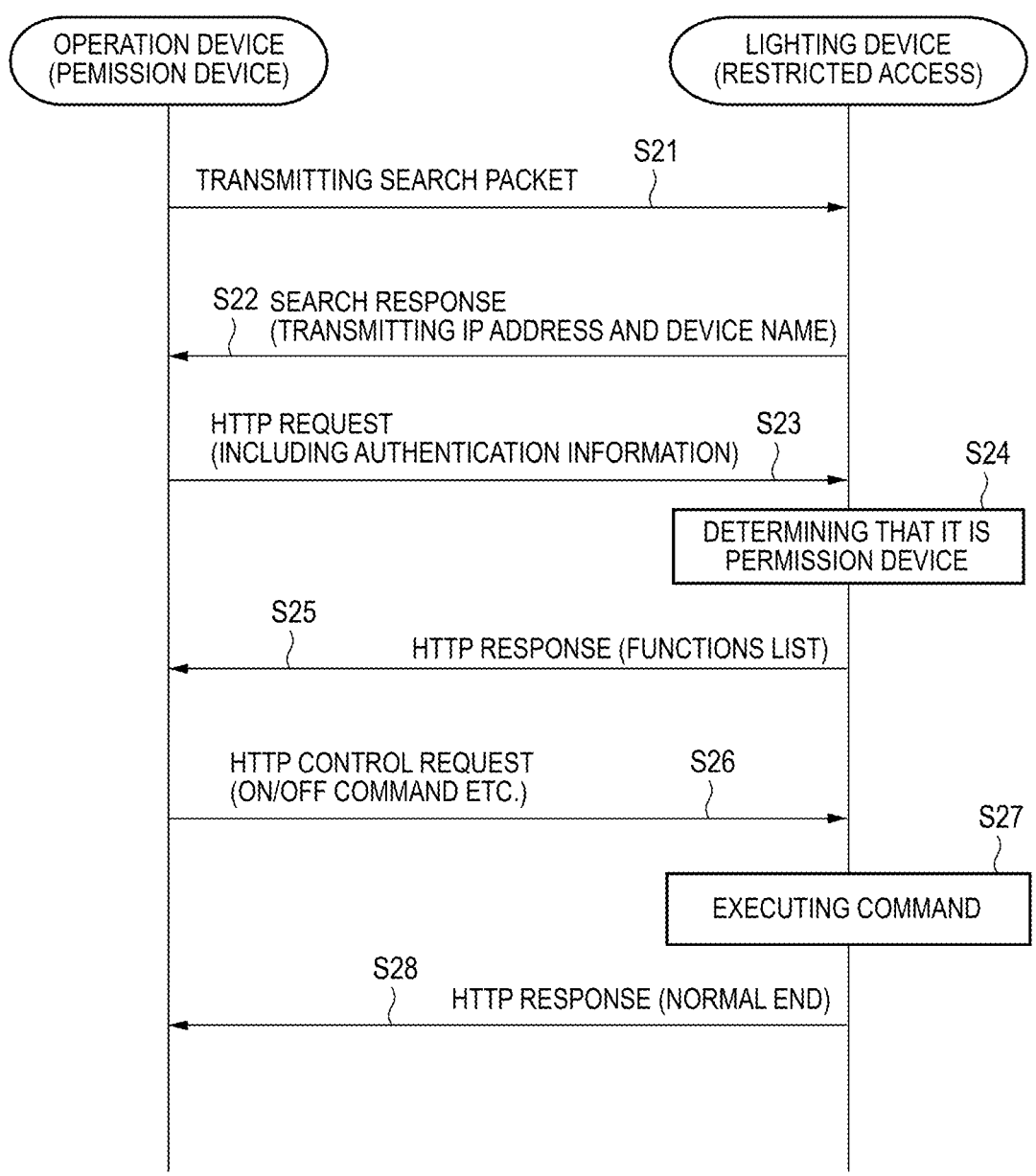
FIG. 7 is a sequence chart showing processes between the operation device 3 and the lighting device 1 in the restricted access mode.

FIG. 6 is a sequence chart showing processes between the operation device 3 and the lighting device 1 in the unrestricted access mode. FIG. 7 shows operations in which the operation device 3, which is a no-permission device, accesses the lighting device 1.

First, the operation device 3 (no-permission device) transmits a search packet used for searching the lighting device 1 by broadcast communication with a device connected to the operation device 3 (step S11). Upon receiving the search packet, the lighting device 1 transmits an IP address of the lighting device 1 and a device name that is information capable of specifying the lighting device 1 to the operation device 3 (step S12) as a response to the search packet for the lighting device 1.

Upon receiving the IP address and the device name of the lighting device 1, the operation device 3 transmits an access request (HTTP request) to the lighting device 1 through HTTP communication (step S13). This request does not include authentication information.

The access controller 20A of the lighting device 1 that has received the access request determines whether or not an IP address of the operation device 3 that has transmitted the HTTP request is stored in the ROM 21. In this case, the IP address of the operation device 3 is not stored in the ROM 21.

Therefore, the access controller 20A determines that the operation device 3 that has transmitted the HTTP request is a no-permission device (step S14). Then, the access controller 20A registers the operation device 3 as a permission device (step S15). Accordingly, the operation device 3 is permitted to access the lighting device 1.

After step S15, the access controller 20A returns a list of functions of the lighting device 1, as well as authentication information included in registration information stored in the ROM 21 in step S15, to the operation device 3 through HTTP communication (step S16). The authentication information is stored in the operation device 3 by using, for example, a cookie mechanism based on RFC6265, and is transmitted to the lighting device 1 from the operation device 3 at time of accessing the lighting device 1 from next time.

Upon receiving the list of functions and the authentication information, the operation device 3 transmits a command to perform a prescribed function to the lighting device 1 through HTTP communication (step S17).

Upon receiving the command, the access controller 20A of the lighting device 1 executes the command (step S18). Then, the access controller 20A transmits a response to the command to the operation device 3, and normally ends communication with the operation device 3 (step S19). Thereafter, processes of steps S17 to S19 are repeated in response to operations of the operation device 3.

FIG. 7 is a sequence chart showing processes between the operation device 3 and the lighting device 1 in the restricted access mode. FIG. 7 shows operation in which the operation device 3, which is a permission device, accesses the lighting device 1.

First, the operation device 3 (permission device) transmits a search packet used for searching the lighting device 1 by broadcast communication with a device connected to the operation device 3 (step S21). Upon receiving the search packet, the lighting device 1 transmits an IP address of the lighting device 1 and a device name that is information capable of specifying the lighting device 1 to the operation device 3 (step S22) as a response to the search packet for the lighting device 1.

Upon receiving the IP address and the device name of the lighting device 1, the operation device 3 transmits an access request (HTTP request) to the lighting device 1 through HTTP communication (step S23). At this time, the operation device 3 transmits authentication information (ID and password) stored in advance to the lighting device 1.

The access controller 20A of the lighting device 1 that has received the access request determines whether or not a combination of an IP address and authentication information received from the operation device 3 that has transmitted the HTTP request is stored in the ROM 21 as registration information.

Here, the combination of IP address and authentication information received from the operation device 3 is stored in the ROM 21 as registration information. Therefore, the access controller 20A determines that the operation device 3 that has transmitted the HTTP request is a permission device (step S24). Accordingly, the operation device 3 is permitted to access the lighting device 1.

After step S24, the access controller 20A returns a list of functions of the lighting device 1 to the operation device 3 through HTTP communication (step S25).

Upon receiving the list of functions, the operation device 3 transmits a command to perform a prescribed function to the lighting device 1 through HTTP communication (step S26).

Upon receiving the command, the access controller 20A of the lighting device 1 executes the command (step S27). Then, the access controller 20A transmits a response to the command to the operation device 3, and normally ends communication with the operation device 3 (step S28). Thereafter, processes of steps S26 to S28 are repeated in response to operations of the operation device 3.

In the unrestricted access mode, operations in which the operation device 3, which is a permission device, accesses the lighting device 1 are the same as is in FIG. 7.

As described above, when the movable member 11a of the slide switch 11A designates the "OFF" position, the lighting device 1 can register an arbitrary operation device 3 as a permission device only by a series of operations of the arbitrary operation device 3 by accessing the lighting device 1. As a result, the arbitrary operating device 3 can access the lighting device 1 without restriction. In this manner, the user can access the lighting device 1 without an operation such as inputting authentication information to the operation device 3, thereby ensuring convenience.

When the operation device 3 that operates the lighting device 1 is, for example, a smartphone, the smartphone is replaced periodically. In this manner, the operation device 3 can be registered as a permission device in the lighting device 1 by a simple operation even when the operation device 3 is periodically replaced, thereby ensuring convenience. Further, only a person who is near the lighting device 1 can operate the movable member 11a of the slide switch 11A. Therefore, only a limited person can set restricted or unrestricted access to the lighting device 1, thereby ensuring security.

The authentication information registered in the lighting device 1 is transmitted to and stored in the operation device 3 by using, for example, a cookie. When the operation device 3 accesses the lighting device 1 as a permission device, the access to the lighting device 1 is permitted by using the cookie. In this manner, the user cannot see the authentication information necessary for accessing the lighting device 1. Therefore, risks of leakage of the authentication information are low, and illegal access to the lighting device 1 is prevented.

Further, it is easy to make the authentication information into complex information since an owner of the operation device 3 does not need to manually input the authentication information, which also ensures security. In this manner, it is not necessary to implement a function of changing authentication information in the lighting device 1 for ensuring security, so that the lighting device 1 is provided at low costs.

The lighting device 1 does not permit access when receiving an access request from a no-permission device in the restricted access mode. However, the lighting device 1 transmits a response and normally ends communication with the no-permission device, as shown in step S8 in FIG. 5.

In this manner, when the lighting device 1 transmits a response to the no-permission device as if the access is successful, it is possible to prevent more hacking than necessary by a person of illegal access. This reduces risks of breach of security.

When the reset button 11B of the lighting device 1 is pressed, the registration information stored in the ROM 21 is deleted. As described above, the lighting device 1 can store the registration information in the ROM 21 by a simple operation of a person near the lighting device 1.

Therefore, there is a chance that, for example, the operation device 3 is registered as a registered device by a third party without being noticed by the user of the lighting device 1. Even in such a case, the security is improved, for example, when the reset button 11B is periodically pressed to reset the registration information.

The registration information deletion unit 20B may also delete the registration information in a case other than when the reset button 11B is pressed.

For example, the registration information deletion unit 20B may delete registration information of a specific permission device when a period of time from last access by the specific permission device exceeds a prescribed period of time.

Accordingly, a capacity of the ROM 21 is used efficiently. Further, registration information can be automatically deleted even when, for example, the lighting device 1 is purchased as a used terminal and registration information of a previous owner remains in the ROM 21, thereby ensuring security.

Figure 8:
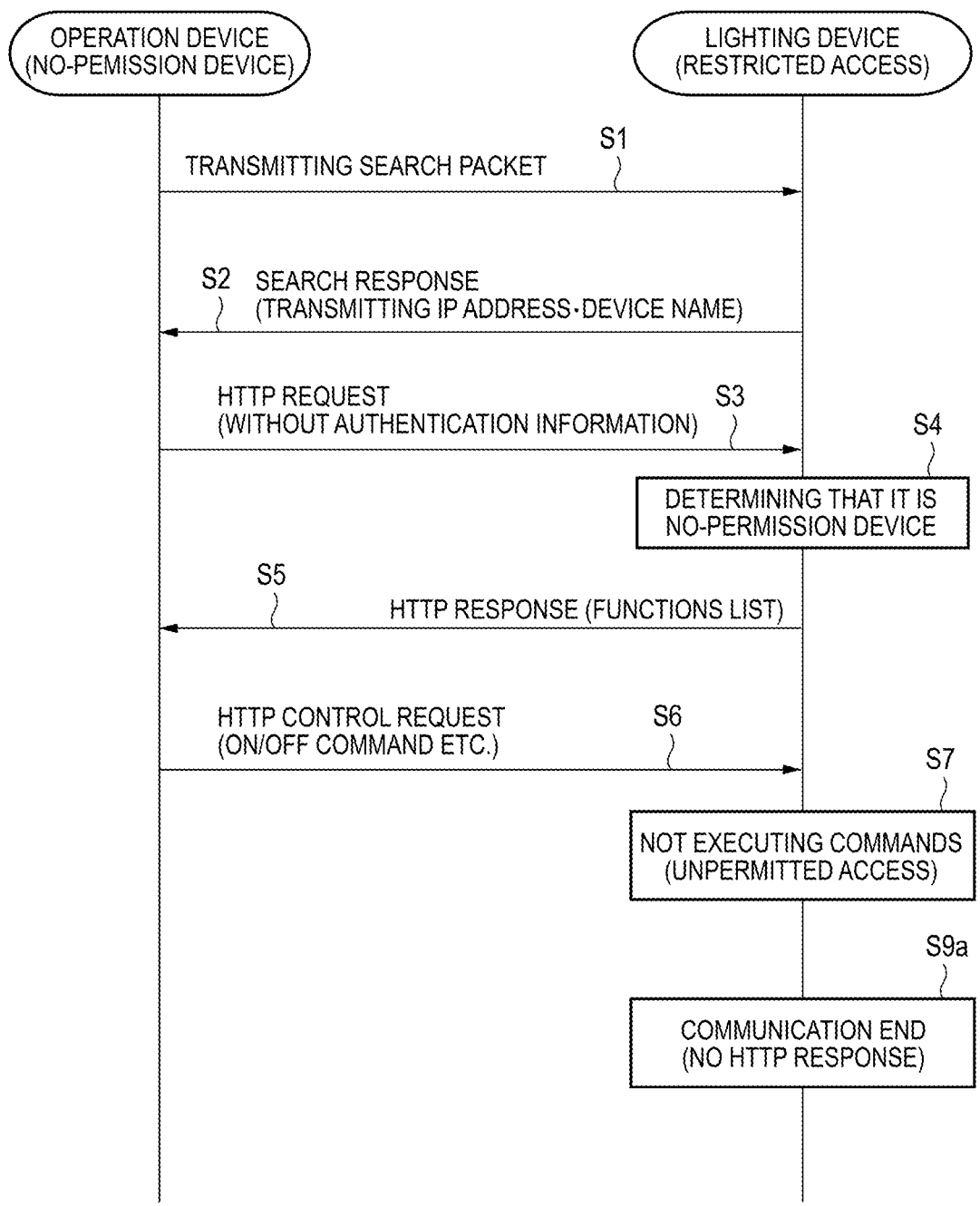
FIG. 8 is a sequence chart showing a modification of operations in FIG. 5.

FIG. 8 is a sequence chart showing a modification of the operations in FIG. 5. FIG. 8 is the same as FIG. 5 except that step S8 is omitted while step S9a is added. In FIG. 8, the same processes as those in FIG. 5 are denoted by the same reference numerals, and descriptions thereof are omitted.

After step S7, the access controller 20A ends communication without transmitting a response to the no-permission device (step S9a).

In this manner, unnecessary information is not transmitted to a person of illegal access since an error response or the like is not transmitted to the no-permission device. Therefore, security is improved.

Figure 9:
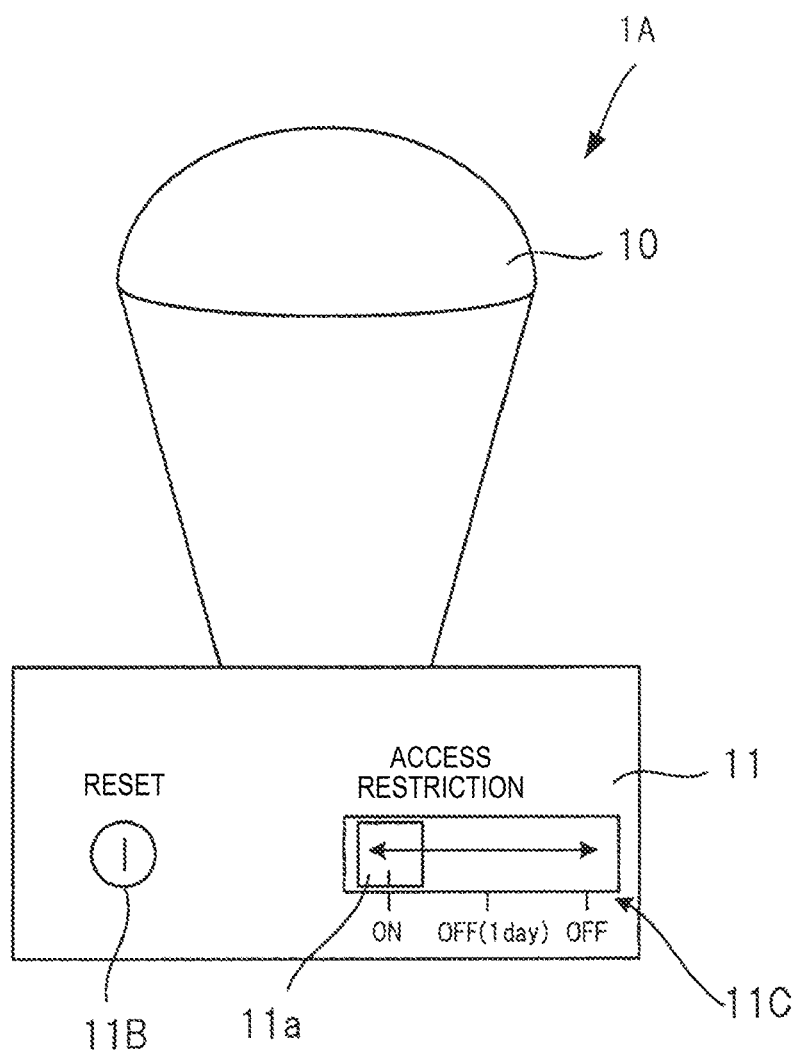
FIG. 9 is a schematic view illustrating an external configuration of a lighting device 1A according to a modification of the lighting device 1 in FIG. 2.

FIG. 9 is a schematic view illustrating an external configuration of a lighting device 1A according to a modification of the lighting device 1 in FIG. 2. An appearance of lighting device 1A is the same as that of the lighting device 1 except that the slide switch 11A is changed into a slide switch 11C.

The slide switch 11C can move the movable member 11a to three positions. When the movable member 11a of the slide switch 11C is in an "ON" position, the lighting device 1A operates in the above restricted access mode.

When the movable member 11a of the slide switch 11C is in an "OFF" position, the lighting device 1A operates in the above unrestricted access mode. When the movable member 11a of the slide switch 11C is in an "OFF (one day)" position, the lighting device 1A operates in a temporary unrestricted access mode.

In the temporary unrestricted access mode, access restriction to the lighting device 1A is released for a predetermined period of time (referred to as a temporary unrestricted period of time). The temporary unrestricted access mode constitutes a definite operation mode. The unrestricted access mode constitutes an indefinite operation mode, in which access is restricted for an indefinite period of time.

When the movable member 11a of the slide switch 11C is in the "OFF (one day)" position and the temporary unrestricted access mode is designated, the access controller 20A of the lighting device 1A performs the same access control as in the unrestricted access mode until the temporary unrestricted period of time (in this case, for example, 24 hours) elapses from a time point when the temporary unrestricted access mode is designated. After the temporary unrestricted period of time, the access controller 20A performs the same access control as in the restricted access mode even when the movable member 11a of the slide switch 11C designates the temporary unrestricted access mode.

In this manner, when the lighting device 1A is provided with a mode in which the access restriction is released only for a certain period of time, chances that a state in which the access restriction is released continues for a long time are reduced when the unrestricted access mode automatically shifts to the restricted access mode after the certain period of time since the mode is set up. This ensures security.

Figure 10:
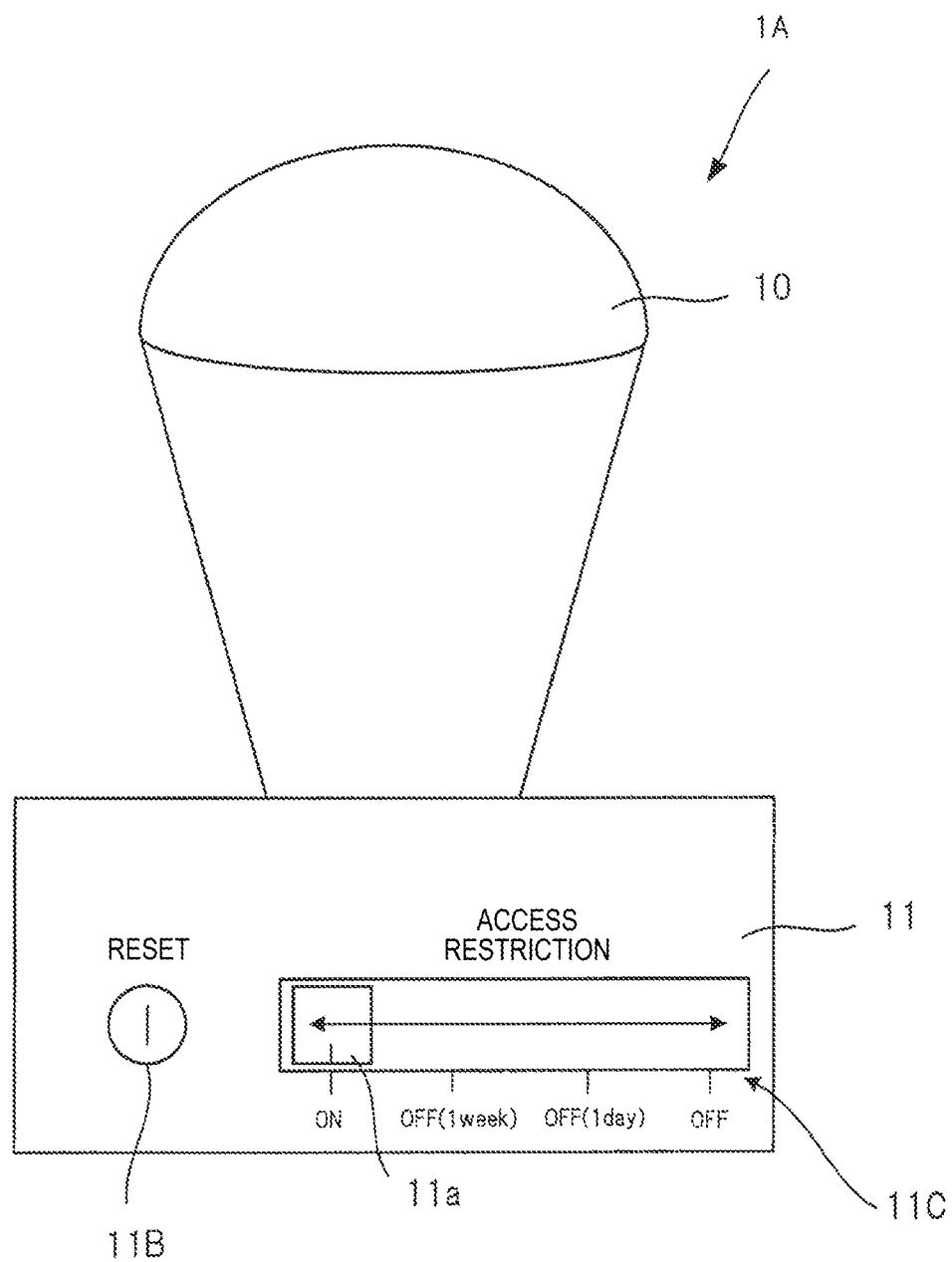
FIG. 10 is a schematic view illustrating another external configuration of the lighting device 1A according to a modification of the lighting device 1 in FIG. 2.

Additionally, the lighting device 1A may also be provided with an operation interface capable of designating the temporary unrestricted period of time. For example, as shown in FIG. 10, the movable member 11a of the slide switch 11C may be a switch that can move to four positions. When the movable member 11a of the slide switch 11C is in the "OFF (one day)" position, the lighting device 1A operates in the temporary unrestricted access mode in which the temporary unrestricted period of time is 24 hours. When the movable member 11a of the slide switch 11C is in an "OFF (one week)" position, the lighting device 1A operates in a temporary unrestricted access mode in which the temporary release period of time is one week. Accordingly, flexible access control is possible since the temporary unrestricted period of time can be changed as necessary. In FIG. 10, a plurality of temporary unrestricted periods of time can be designated by the slide switch 11C. However, for example, a switch that operates in the temporary unrestricted access mode in which the temporary unrestricted period of time is 24 hours, as well as a switch that operates in the temporary unrestricted access mode in which the temporary unrestricted period of time is one week, may be separately provided.

When the temporary unrestricted access mode is set, the registration information registered in the ROM 21 by the registration information deletion unit 20B is preferably deleted after the above certain period of time. In this manner, when the operation device 3 in which registration information is deleted accesses the lighting device 1A, as shown in FIG. 5, the lighting device 1A performs the same operation as that in the case where the operation device 3 is a no-permission device. When the registration information is deleted in this manner, the operation device 3 registered as a permission device during a certain period of time can access the lighting device 1 for only the certain period of time, thereby ensuring security.

When the temporary unrestricted access mode is set, the registration information registered in the ROM 21 by the registration information deletion unit 20B is deleted after the above certain period of time. However, identification information of the operation device 3 included in the registration information may be left in the ROM 21.

In this case, when the access controller 20A is accessed by the operation device 3 (a device registered as a permission device in the past) in which the identification information is stored in the ROM 21, the access controller 20A transmits a response (for example, information indicating that a command is normally completed or information indicating that a time limit enabling registration as a permission device is ended) to the access to the operation device 3 in the step S8 in FIG. 5, and normally ends communication with the operation device 3. Accordingly, security against hacking is improved, and the user of the operation device 3 can know a reason why the command was not executed by the lighting device 1A.

When the movable member 11a of the lighting device 1 in FIG. 2 is in the "OFF" position, the access controller 20A may perform access control in the temporary unrestricted access mode instead of the unrestricted access mode.

The lighting device 1 of the system 100 described above may be replaced with another communication device that can be remotely operated using a communication function.

For example, a communication device such as a digital camera, a robot vacuum cleaner, a washing machine, a refrigerator, an NAS, or an air conditioner may be used instead of the lighting device 1. The communication device in this case includes the slide switch 11A (slide switch 11C in FIG. 9 or 10) in FIG. 2, the reset button 11B, and hardware in which the light emitting unit 10 in FIG. 3 is replaced to realize a main function of the communication device.

In the system 100, when the slide switch 11A (or the slide switch 11C) and the reset button 11B are included in the relay device 2, these units may also function as the access controller 20A and the registration information deletion unit 20B with a CPU of the relay device 2 executing a program and cooperating with hardware. With this configuration, the relay device 2 controls access from the operation device 3 that accesses the lighting device 1 connected to the relay device 2 via wireless or wired communication with one of the restricted access mode, the unrestricted access mode, and the temporary unrestricted access mode.

When the relay device 2 having this configuration is used, access restriction and release of the access restriction to, for example, a lighting device directly attached to a ceiling (a lighting device that is less likely to be touched by a user after attachment) are performed by a switch in the relay device 2. Therefore, convenience is improved.

When the relay device 2 having this configuration is used, access control to a plurality of lighting devices 1 is collectively performed by one switch in the relay device 2 even when, for example, the plurality of lighting devices 1 are connected to the relay device 2. Therefore, convenience is improved.

Additionally, when the slide switch 11A (or the slide switch 11C) and the reset button 11B are included in the relay device 2, the slide switch 11A (or the slide switch 11C) and the reset button 11B may be provided for each of the plurality of lighting devices 1 connected to the relay device 2, so as to control access restriction and release of the access restriction to each of the plurality of lighting devices 1.

Accordingly, it is possible to release access restriction from only a desired lighting device 1, and convenience is improved. Further, a control target and setting thereof can be checked at one time by the switch in the relay device 2, and the control target can be selected when the switch is operated. Therefore, convenience is improved.

When the relay device 2 having this configuration is used, a location where the switch of the relay device 2 is operated can be freely selected when the user moves the relay device 2, and the relay device 2 can be used at an arbitrary location. Therefore, convenience is improved.

When the relay device 2 having this configuration is used, it is possible to prevent an unauthorized third party from touching the switch by moving the relay device 2 to an unobtrusive place. This ensures security.

In the system 100, a method for the lighting device 1 or the lighting device 1A to generate authentication information includes a method in which one piece of information is determined in advance or a method of changing authentication information for each operation device 3 that requests access. Alternatively, the authentication information may be changed each time a permission device is registered. Security is better ensured when the authentication information is not fixed in this manner.

The system 100 does not have to include the relay device 2. For example, the operation device 3 may directly communicate with the lighting device 1 or the lighting device 1A according to IEEE802.11 standard, Bluetooth (registered trademark), or Bluetooth-PAN (Personal Area Network (PAN) connection according to the Bluetooth standard).

A program including the above operation program is stored in a non-transitory computer-readable medium. Examples of such a medium include but not limited to a portable medium such as a flexible disk, a CD (Compact Disc)-ROM, a DVD disc (DVD-Video, DVD-RAM, DVD-R, DVD-RW, DVD+R, DVD+RW, and the like), or a Blu-ray (registered trademark) disk, and may also include an internal storage device in a computer such as various types of RAM or ROM, and an external storage device fixed to a computer such as a hard disk. That is, the "non-transitory computer-readable medium" has a broad meaning that includes any medium in which data can be fixed rather than be temporarily stored.

Such a program may be also downloaded to the lighting device 1 via the Internet.

As described above, the present specification discloses the following matters.

(1) A communication device, including:
processing circuitry configured to
receive an input to switch an operation mode between a first operation mode in which access to the communication device or a connected device connected to the communication device is restricted and a second operation mode in which access is not restricted;
control the access from devices that transmitted access requests in accordance with the first operation mode or the second operation mode, which is designated by the received input; and
permit a no-permission device that has no permission for the access to access the communication device or the connected device based on an access request from the no-permission device by registering the no-permission device as a permission device, in a case where the operation mode is the second operation mode.

(2) The communication device according to (1) further including an operation member, in which the processing circuitry is configured to receive the input via the operation member.

(3) The communication device according to (1), in which the processing circuitry is configured to permit only access from a device registered as the permission device in a case where the operation mode is the first operation mode.

(4) The communication device according to (1), in which the processing circuitry is configured not to permit the access based on the access request and not to transmit a response to the no-permission device, in a case where the operation mode is the first operation mode and the no-permission device transmitted the access request.

(5) The communication device according to (1), in which the processing circuitry is configured not to permit the access based on the access request and to transmit a predetermined response to the no-permission device, in a case where the operation mode is the first operation mode and the no-permission device transmitted the access request.

(6) The communication device according to (1), in which the processing circuitry is configured to:
generate authentication information necessary for the access from the no-permission device that transmitted the access request, in a case where the operation mode is the second operation mode; and
register the no-permission device that transmitted the access request as the permission device by storing, in a memory, the generated authentication information in association with the no-permission device.

(7) The communication device according to (1), in which the second operation mode includes a definite operation mode in which access restriction is released only for a predetermined period of time, and
the processing circuit is configured to:
permit the access based on the access request by registering the no-permission device that transmitted the access request as the permission device, from a time point when the operation mode is switched to the definite operation mode to a time point when the predetermined period of time elapses; and
control the access in the first operation mode in a case where the operation mode is switched to the definite operation mode after the elapse of the predetermined period of time.

(8) The communication device according to (7), in which the second operation mode includes an indefinite operation mode in which access restriction is released indefinitely, and
the processing circuitry is configured to permit the access based on the access request by registering the no-permission device that transmitted the access request as the permission device, in a case where the operation mode is the indefinite operation mode.

(9) The communication device according to (1), in which the processing circuitry is configured to delete registered information of the permission device.

(10) The communication device according to (9), in which the processing circuitry is configured to:
receive an input to delete the registered information; and
delete the registered information in response to receiving the input to delete the registered information,

(11) The communication device according to (10), further including a deletion operation member, in which the processing circuitry is configured to receive the input to delete the registered information via the deletion operation member.

(12) The communication device according to (11), in which the deletion operation member is a physical reset button or a touch panel.

(13) The communication device according to (9), in which the processing circuitry is configured to delete the registered information of the permission device, a period of time since last access by the permission device exceeding a predetermined period of time.

(14) The communication device according to (2), in which the operation member is a physical switch or a touch panel.

(15) The communication device according to (5), in which the predetermined response is the same as a response transmitted to the permission device.

(16) The communication device according to (2), in which the operation member is configured to output a first signal to the processing circuitry in response to an operation for designating the first operation mode, and output a second signal to the processing circuitry in response to an operation for designating the second operation mode, and
the processing circuitry is configured to determine whether the operation member designates the first operation mode or the second operation mode based on the received first signal or the received second signal.

(17) The communication device according to (1), in which the processing circuitry is configured to permit access to the connected device by registering the no-permission device as the permission device, in a case where the operation mode is the second operation mode, and
the processing circuitry is configured not to permit access to the connected device and not to transmit a response to the no-permission device, in a case where the operation mode is the first operation mode and the no-permission device transmitted the access request.

(18) An operation method, including:
receiving, using processing circuitry, an input to switch an operation mode between a first operation mode in which access to a communication device or a connected device connected to the communication device is restricted and a second operation anode in which access is not restricted;
controlling, using the processing circuitry, the access from devices that transmitted access requests in accordance with the first operation mode or the second operation mode, which is designated by the received input; and
permitting, using the processing circuitry, a no-permission device that has no permission for the access to access the communication device or the connected device based on the access request from the no-permission device by registering the no-permission device as a permission device, in a case where the operation mode is the second operation mode.

(19) A non-transitory computer-readable medium including executable instructions, which when executed by a computer cause the computer to execute an operation method, the operation method including:
receiving an input to switch an operation mode between a first operation mode in which access to the communication device or a connected device connected to the communication device is restricted and a second operation mode in which access is not restricted;

controlling the access from devices that transmitted access requests in accordance with the first operation mode or the second operation mode, which is designated by the received input; and permitting a no-permission device that has no permission for the access to access the communication device or the connected device based on the access request from the no-permission device by registering the no-permission device as a permission device, in a case where the operation mode is the second operation mode.

According to the embodiment of the present disclosure, it is possible to provide an inexpensive and convenient communication device that can ensure security, an operation method of a communication device, and an operation program of a communication device.

The invention claimed is:

1. A communication device, comprising:
processing circuitry configured to
receive an input to switch an operation mode between a first operation mode in which access to the communication device or a connected device connected to the communication device is restricted and a second operation mode in which access is not restricted;
control the access from devices that transmitted access requests in accordance with the first operation mode or the second operation mode, which is designated by the received input;
register, as a permission device, a no-permission device that has no permission for the access to access the communication device or the connected device, without receiving authentication information from the no-permission device for registering the no-permission device as the permission device, based on the access request from the no-permission device in a case where the operation mode is the second operation mode; and
after registering the no-permission device as the permission device, transmit authentication information to the no-permission device, such that the no-permission device can control the communication device to perform a function of the communication device using the authentication information, wherein the communication device and the no-permission device are end point devices that are connected via the Internet, where the communication device functions as an access controller for the no-permission device.

2. The communication device according to claim 1, further comprising an operation member, wherein
the processing circuitry is configured to receive the input via the operation member.

3. The communication device according to claim 1, wherein the processing circuitry is configured to permit only access from a device registered as the permission device in a case where the operation mode is the first operation mode.

4. The communication device according to claim 1, wherein the processing circuitry is configured not to permit the access based on the access request and not to transmit a response to the no-permission device, in a case where the operation mode is the first operation mode and the no-permission device transmitted the access request.

5. The communication device according to claim 1, wherein the processing circuitry is configured not to permit the access based on the access request and to transmit a predetermined response to the no-permission device, in a case where the operation mode is the first operation mode and the no-permission device transmitted the access request.

6. The communication device according to claim 1, wherein the processing circuitry is configured to:
generate the authentication information necessary for the access from the no-permission device that transmitted the access request, in a case where the operation mode is the second operation mode; and
register the no-permission device that transmitted the access request as the permission device by storing, in a memory, the generated authentication information in association with the no-permission device.

7. The communication device according to claim 1, wherein
the second operation mode includes a definite operation mode in which access restriction is released only for a predetermined period of time, and
the processing circuit is configured to:
permit the access based on the access request by registering the no-permission device that transmitted the access request as the permission device, from a time point when the operation mode is switched to the definite operation mode to a time point when the predetermined period of time elapses; and
control the access in the first operation mode in a case where the operation mode is switched to the definite operation mode after the elapse of the predetermined period of time.

8. The communication device according to claim 7, wherein
the second operation mode includes an indefinite operation mode in which access restriction is released indefinitely, and
the processing circuitry is configured to permit the access based on the access request by registering the no-permission device that transmitted the access request as the permission device, in a case where the operation mode is the indefinite operation mode.

9. The communication device according to claim 1, wherein the processing circuitry is configured to delete registered information of the permission device.

10. The communication device according to claim 9, Wherein the processing circuitry is configured to:
receive an input to delete the registered information; and
delete the registered information response o receiving the input to delete the registered information.

11. The communication device according to claim 10, further comprising a deletion operation member, wherein
the processing circuitry is configured to receive the input to delete the registered information via the deletion operation member.

12. The communication device according to claim 11, wherein the deletion operation member is a physical reset button or a touch panel.

13. The communication device according to claim 9, wherein the processing circuitry is configured to delete the registered information of the permission device, a period of time since last access by the permission device exceeding a predetermined period of time.

14. The communication device according to claim 2, wherein the operation member is a physical switch or a touch panel.

15. The communication device according to claim 5, wherein the predetermined response is the same as a response transmitted to the permission device.

16. The communication device according to claim 2, wherein the operation member is configured to output a first signal to the processing circuitry in response to an operation for designating the first operation mode, and output a second signal to the processing circuitry in response to an operation for designating the second operation mode, and the processing circuitry is configured to determine whether the operation member designates the first operation mode or the second operation mode based on the received first signal or the received second signal.

17. The communication device according to claim 1, wherein the processing circuitry is configured to permit access to the connected device by registering the no-permission device as the permission device, in a case where the operation mode is the second operation mode, and the processing circuitry is configured not to permit access to the connected device and not to transmit a response to the no-permission device, in a case where the operation mode is the first operation mode and the no-permission device transmitted the access request.

18. The communication device according to claim 1, wherein the processing circuitry is configured to:

receive an access request from a first device, the access request including an IP address of the first device;

determine whether the IP address is stored in a memory of the communication device; and judge the first device as the no-permission device in a case where the IP address is determined not to be stored in the memory.

19. The communication device according to claim 1, wherein the processing circuitry is configured to:

receive an access request from a first device, the access request including an IP address of the first device and authentication information of the first device;

determine whether a combination of the IP address and the authentication information of the first device is stored in a memory of the communication device; and judge the first device as a permission device that has permission for the access to access the communication device or the connected device in a case where the combination is determined to be stored in the memory, even when the operation mode is the first operation mode.

20. The communication device according to claim 1, wherein the processing circuitry is further configured to transmit a function list that lists at least the function of the communication device to the no-permission device together with the authentication information, such that the no-permission device can control the function of the communication device.

21. An operation method, comprising:

receiving, using processing circuitry, an input to switch an operation mode between a first operation mode in which access to a communication device or a connected device connected to the communication device is restricted and a second operation mode in which access is not restricted;

controlling, using the processing circuitry, the access from devices that transmitted access requests in accordance with the first operation mode or the second operation mode, which is designated by the received input;

registering, as a permission device, using the processing circuitry, a no-permission device that has no permission for the access to access the communication device or the connected device, without receiving authentication information from the no-permission device for registering the no-permission device as the permission device, based on the access request from the no-permission device in a case where the operation mode is the second operation mode; and after registering the no-permission device as the permission device, transmitting authentication information to the no-permission device, such that the no-permission device can control the communication device to perform a function of the communication device using the authentication information, wherein the communication device and the no-permission device are end point devices that are connected via the Internet, where the communication device functions as an access controller for the no-permission device.

22. A non-transitory computer-readable medium including executable instructions, which when executed by a computer cause the computer to execute an operation method, the operation method comprising:

receiving an input to switch an operation mode between a first operation mode in which access to a communication device or a connected device connected to the communication device is restricted and a second operation mode in which access is not restricted;

controlling the access from devices that transmitted access requests in accordance with the first operation mode or the second operation mode, which is designated by the received input;

registering, as a permission device, a no-permission device that has no permission for the access to access the communication device or the connected device, without receiving authentication information from the no-permission device for registering the no-permission device as the permission device, based on the access request from the no-permission device in a case where the operation mode is the second operation mode; and after registering the no-permission device as the permission device, transmitting authentication information to the no-permission device, such that the no-permission device can control the communication device to perform a function of the communication device using the authentication information, wherein the communication device and the no-permission device are end point devices that are connected via the Internet, where the communication device functions as an access controller for the no-permission device.

* * * * *